United States Patent [19]

Kamlay

[11] 4,143,915

[45] Mar. 13, 1979

[54] TABLE FOR A CHILD SAFETY SEAT

[76] Inventor: Sara K. Kamlay, 11825 Old Spring Rd., Louisville, Ky. 40223

[21] Appl. No.: 857,103

[22] Filed: Dec. 5, 1977

[51] Int. Cl.² .................... B60R 21/00; A62B 35/00
[52] U.S. Cl. .................................. 297/390; 108/156; 297/153; 297/216
[58] Field of Search ............... 297/136, 137, 138, 148, 297/153, 390, 216, DIG. 6; 248/188.2; 24/204; 296/84 K; 180/90; 46/26, 25, 24; 108/156

[56] References Cited

U.S. PATENT DOCUMENTS

| 2,724,427 | 11/1955 | McCarson | 296/136 |
|---|---|---|---|
| 2,893,164 | 7/1959 | Martin | 248/188.2 |
| 2,979,121 | 4/1961 | Gates | 297/390 X |
| 3,305,982 | 2/1967 | Steele | 46/25 |
| 3,775,785 | 12/1973 | Mittendorf | 5/357 |
| 3,777,435 | 12/1973 | Perina | 24/204 |
| 3,788,699 | 1/1974 | Starr | 297/153 X |

FOREIGN PATENT DOCUMENTS 494930 6/1919 France ..................................... 108/156

Primary Examiner—James T. McCall
Attorney, Agent, or Firm—Cullen, Sloman, Cantor, Grauer, Scott & Rutherford

[57] ABSTRACT

A safety table for use by an infant or child sitting on a seat support comprises a panel-like top having upper and lower surfaces and made from a resilient material. A plurality of legs depend from the lower surface of the panel-like top and are also made from a resilient material. Fastening means are provided for each of the legs for removably securing the corresponding leg to the lower surface of the panel-like top. With such a construction the legs when assembled elevate the panel-like top above the seat support to permit the legs of the infant or child to extend under the panel-like top. The resilient material utilized to form the safety table is firm yet soft and provides a resilient cushion in the event the child should strike or hit the panel-like top or legs thereby preventing serious injury.

18 Claims, 4 Drawing Figures

U.S. Patent    Mar. 13, 1979    4,143,915
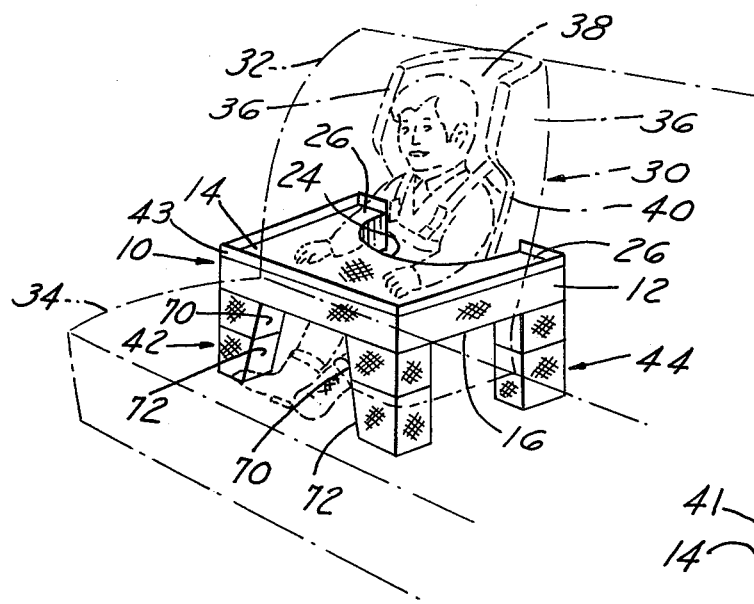
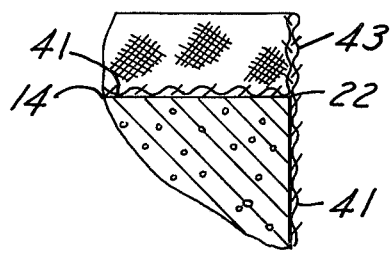
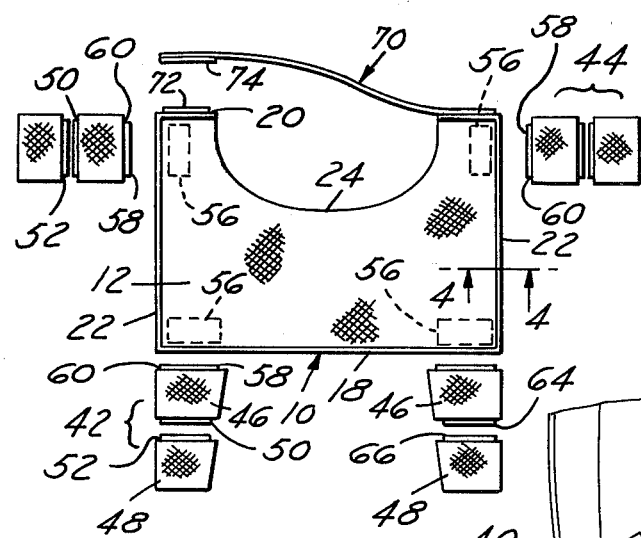
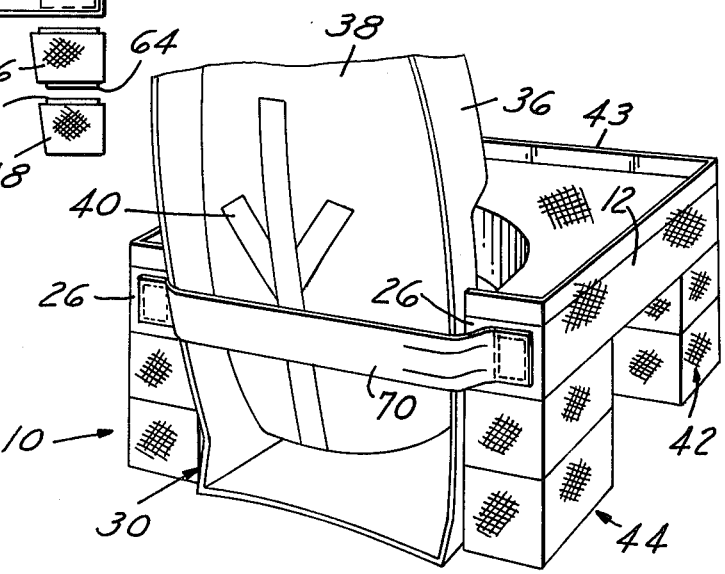

TABLE FOR A CHILD SAFETY SEAT

BACKGROUND OF THE INVENTION

1. Field of the Invention

This invention relates to a safety table for use by an infant in an automobile primarily in cooperation with a child safety seat which is strapped to an automobile seat although the table may be used only with an automobile seat. The child or infant is strapped in the seat in a conventional manner, with the table having a recess in one edge thereof to fit around the infant. The table is strapped to the child safety seat when one is used.

2. Description of the Prior Art

The prior art illustrates various tables for use in connection with certain types of chairs or supports so that an infant may be held in a seated position thereon, and at the same time be provided with a support for toys, feeding dishes, playthings and the like. Such a construction is shown in U.S. Pat. No. 2,429,498 which issued to Maynard W. Wells on Oct. 21, 1947. Other types of tables located during a novelty search in the U.S. Patent and Trademark Office are shown in the following U.S. Pat. Nos.: 3,589,311 to Richard T. Medlen, dated June 29, 1971; 3,031,242 to William S. Sawle III, dated Apr. 24, 1962; 2,832,657 to Fermin F. Cariaga, dated Apr. 29, 1958; and 2,724,427, to Raymond F. McCarson, dated Nov. 22, 1955. However, none of the prior art patents disclose the structural features of the present invention as claimed herein.

SUMMARY OF THE PRESENT INVENTION

It is a feature of the present invention to provide a safety table for use by an infant or child sitting on a seat support comprising a panel-like top having upper and lower surfaces and made from a resilient material, a plurality of legs depending from the lower surface of the panel-like top and made from a resilient material, and fastening means for each of the legs for removably securing the corresponding leg to the lower surface of the panel-like top, with the legs being adapted to elevate the panel-like top above the seat support to permit the legs of the infant to extend under the panel-like top.

A further feature of the present invention is to provide a table of the aforementioned type wherein each of the fastening means includes a pair of interlocking members, one of the members being secured to the lower surface of the panel-like top and the other of the members being secured to the top surface of the corresponding leg, with the one member being armed with first interlocking loop and hook fabric material and the other member being armed with second interlocking loop and hook fabric material.

A still further feature of the present invention is to provide a table of the aforementioned type wherein the panel-like top is of generally rectangular configuration, with a leg and corresponding fastening means being provided at each of the four corners thereof.

Another feature of the present invention is to provide a table of the aforementioned type wherein the panel-like top has a relatively wide and a relatively deep recess extending inwardly from one edge thereof to accommodate the body of the infant therein.

Still another feature of the present invention is to provide a table of the aforementioned type wherein the panel-like top and the legs are made from a foam plastic material to cushion the impact and thus avoid injury should the child or infant hit the top or legs of the table.

A further feature of the present invention is to provide a table of the aforementioned type wherein each of the legs is made from a pair of upper and lower leg elements having opposing surfaces which abut and are removably secured together by additional fastening means.

A still further feature of the present invention is to provide a table of the aforementioned type wherein each of the additional fastening means includes a pair of interlocking strips, one of the strips being secured to the lower surface of the upper leg element and the other of the strips being secured to the top surface of the corresponding lower leg element, with the strips being armed with interlocking loop and hook fabric material.

Another feature of the present invention is to provide a table of the aforementioned type wherein the legs at the front corners thereof have inner surfaces, with the inner surface of one front corner leg facing the inner surface of the other front corner leg, the inner surface of each leg being flat and tapered starting at the top of the leg and extending downwardly and away from the inner surface on the other front leg.

Still another feature of the present invention is to provide a table of the aforementioned type wherein the panel-like top and legs are covered with a cloth fabric material, with a rim made from cloth fabric material extending upwardly from the upper surface of the panel-like top and being located around at least part of the periphery thereof for assisting in retaining objects used by the infant on the panel-like top.

A further feature of the present invention is to provide a table of the aforementioned type wherein a stretchable strap is secured on one end thereof to the rear edge of the panel-like top and is adapted to extend around the seat support and be removably secured on the other end thereof to an opposite portion of the rear edge of the panel-like top to fasten the table to the seat support.

A still further feature of the present invention is to provide an infant's table or appliance which is simple in construction, easy to manufacture, pleasing in appearance, is light in weight, is strong and durable, is readily handled in applying it to and removing the same from a seat or like support and in which the top and legs thereof are made from resilient materials such as foam plastic materials thus providing additional cushioning thereby helping to prevent injury should the infant strike the table.

Another feature of the present invention is to provide a knock-down type of table in which the legs are removable for cleaning and storage purposes, with the legs each being made in sections to accommodate the height of the infant and the use of the table with a child safety seat or directly on a vehicle seat.

Still another feature is to provide a combination car seat and table assembly in between which the infant is strapped, whereby the infant can safely sleep, eat and play and wherein the table may be readily disassembled, cleaned and stored in a minimum of space when not in use.

IN THE DRAWING

FIG. 1 is a front perspective view of the table installed or wrapped around a child safety seat and mounted therewith on an automobile seat;

FIG. 2 is an exploded view of the table, with the legs removed and located adjacent the corners of the panel-like top of the table;

FIG. 3 is a rear perspective view of the table wrapped around a child safety seat and secured thereto by an expandable strap; and FIG. 4 is a sectional view through the panel-like top of the table taken on the line 4—4 of FIG. 2 and illustrating the upstanding rim thereon made from a cloth fabric material.

DESCRIPTION OF A PREFERRED EMBODIMENT

The novel table 10 comprises a generally rectangular panel-like top, tray or base 12 of generally uniform thickness having a flat upper surface 14 and a flat lower surface 16. The panel-like top 12 has a front edge or surface 18, a rear edge or surface 20 and a pair of parallel sides or side edges 22. The rear edge 20 is provided with a centrally located relatively wide and relatively deep recess 24 in between a pair of rear edge portions 26.

The table 10 is primarily designed for use with a child safety seat 30 which is strapped to the back 32 of a seat or cushion 34 of an automobile. The child safety seat 30 has a pair of wings or sides 36 along the back 38 thereof as shown in FIG. 1. The child rests on the bottom of the seat 30 and is retained in the child safety seat 30 by a plurality of straps 40. Once the child is strapped in the seat 30, the table 10 is placed in front of the child, with the child or infant occupying the recess 24.

The panel-like top 12 is made from resilient material such as a conventional foam plastic or foam rubber material. The material is firm yet soft and provides a cushion in the event the infant or child should strike or hit the top 12 thus helping to prevent serious injury to the child. The resilient top 12 is covered with a conventional cloth fabric material 41 which is washable. The fabric material 14 may be made in the form of a removable casing, like a pillow casing, or be permanently affixed to the top 12 so as to cover the top, bottom and sides thereof. The cloth fabric material 41 has an upstanding rim or border 43 which extends around the front edge 18, side edges 22 and around the rear edge portions 26. The rim 43, if desired, may also extend around the rear periphery defining the edge of the recess 24. The rim 43 provides a flexible or yieldable barrier or border which helps to maintain the toys, feeding dishes and other objects and playthings on the upper surface 14 of the top 12.

The table 10 includes a plurality of removable front and back legs 42 and 44 respectively depending from the lower surface 16 of the panel-like top 12. The panel-like top 12 has four corners and each corner is provided with a removable supporting leg as shown in the drawing. The legs 42, 44 are secured to the lower surface 16 of the top 12 by fastening means to be subsequently described.

Each leg 42, 44 is made in two sections or elements. Each of the front legs 42 has a pair of upper and lower leg elements 46 and 48 respectively which may be removably secured together when in use. Upper leg element 46 and lower leg element 48 have opposing flat surfaces 50 and 52 respectively which face and abut one another and are removably secured together by additional fastening means.

Each corner on the lower surface 16 is provided with a leg 42, 44. The legs 42, 44 are removably secured to the corners of the top 12 by fastening means and elevate the panel-like top above the seat support to permit the legs of the infant to extend under the panel-like top. The fastening means includes a pair of interlocking fabric-like members 56 and 58. Interlocking member 56 is secured by an adhesive or by sewing to the lower surface 16 of the top 12 and the other interlocking member 58 is secured to the top surface 60 by an adhesive or by sewing to the opposing leg 42, 44. The one interlocking member 56 is armed with first interlocking loop and hook fabric material and the other interlocking member 58 is armed with second interlocking loop and hook fabric material.

The additional fastening means used to secure each of the corresponding leg elements 46, 48 together includes a pair of interlocking fabric-like strips. One of the strips 64 is secured to the lower surface 50 of the upper leg element 46 and the other strip 66 is secured to the top surface 52 of the corresponding lower leg element 48. The strips 64, 66 are each armed with interlocking loop and hook fabric material.

The two fabric-like interlocking members, elements or strips 56 for the rear legs 44 are parallel to one another and to the side edges 22 and the two interlocking members 56 for the front legs 42 are aligned and are parallel to the front edge of the top 12 as shown in FIG. 2.

The leg elements 46, 48 of each leg are made from a resilient material such as a foam plastic or a foam rubber material. The leg elements are enclosed or covered with a cloth fabric material which is washable. The rear leg elements are each of rectangular configuration with the sides thereof being flat.

Leg elements 46, 48 of the front legs 42 each has an inner flat surface 70 and 72 respectively. The inner surfaces 70, 72 of one pair of front leg elements 46, 48 face the inner surfaces on the other pair of front leg elements as shown in FIG. 1. The corresponding pair of inner surfaces of a pair of leg elements are tapered starting at the top and extending downwardly and away from the other front leg or leg elements. Thus the distance between the inner surfaces of the pair of front legs 42 is greater at the bottom than at the top as shown in FIG. 1. Thus the tapered or angled surfaces 70, 72 provide additional room or space for the child's legs.

An elongated elastic fabric band or strap 70 is permanently secured on one end thereof to the tray or top 12 and, after the table 12 is inserted or wrapped around the child in the child safety seat 30, the strap 70 is extended across the rear side of back 38 of chair or seat support 30 and is removably secured to the top 12 adjacent the rear edge thereof. A pair of interlocking members are provided, one member 72 secured to the rear edge or side 20 of top 12 and the other member 74 secured to the strap 70. The members 72, 74 are armed with interlocking loop and hook fabric material. The elastic strap 70 may be made from any of the commercially available stretchable fabric materials on the market such as "Lykra".

The straps, strips and interlocking members described previously are formed from a fabric material, such as nylon tape, wherein the fabric surface is covered with minute hooks or minute loops. When a hook armed fabric surface is pressed into contact with a loop armed surface, the respective surfaces lock together and can be peeled apart only by the exertion of a certain amount of force. As an example it follows that the fabric of strip 56 may be either hook armed or loop armed, but that in any event the straps or members of the various fastening means should be equipped with the opposite armament. The loops can be easily discerned by the fact that they form a pile surface; while the hooks form a surface that is harsh and unyielding to the touch. A commercial form of this fabric structure is known as "VELCRO". The strips of fabric are fastened flat to the sheet material by adhesive, by staples or other convenient means. The extent of distribution of the locking surfaces is optional. Where "VELCRO" can be used for the several interlocking members or strips, other commercial quick opening means may be used.

"VELCRO" (Velcro S.A., Fribourg, Switzerland) is a velvet type fabric comprising a structure including a plurality of auxiliary warp threads of a synthetic resin material in the form of raised pile threads, the terminal portions of which are at least in part in the form of material-engaging hooks; U.S. Pat. No. 2,717,437.

As the child grows out of the safety car seat 30 where it is no longer required, the child is strapped directly to the car seat 34. The table 10 can still be used; however one leg element of each leg is removed. As an example the upper leg element 46 of each leg 42, 44 is removed and the upper surfaces 52 of the leg elements 48 are secured directly to the interlocking members 56. In such a case the stretch band 70 is wrapped around the back of the child and assists in holding the child in the table recess 24.

The cloth fabric material may be made in different colors and with different designs to present a pleasing appearance. Plastic cloth materials may also be used.

As shown in FIGS. 1 and 3, the rear edge portions 26 of the table 10 are wrapped around the sides 36 of the safety car seat 30, with the strap 70 holding the table 10 secured to seat 30.

The leg elements are thus easily separated from one another and from the top 12 for cleaning and storage purposes. A minimum amount of space is required to store the collapsed or disassembled table 10.

What is claimed is:

1. A table for use by an infant sitting on a seat support comprising a panel-like top having upper and lower surfaces and being made from a resilient material, a plurality of legs depending from the lower surface of said panel-like top and being made from resilient material, and fastening means for each of said legs for removably securing the corresponding leg to the lower surface of said panel-like top, said legs being adapted to elevate the panel-like top above the seat support to permit the legs of the infant to extend under said panel-like top, each of said fastening means including a pair of interlocking members, one of said members being secured to the lower surface of said panel-like top and the other of said members being secured to the top surface of the corresponding leg, said one member being armed with first interlocking loop and hook fabric material and said other member being armed with second interlocking loop and hook fabric material.

2. The table defined in claim 1 wherein said panel-like top is of generally rectangular configuration, with a leg and corresponding fastening means being provided at each of the four corners thereof.

3. The table defined in claim 2 wherein said panel-like top has a relatively wide and a relatively deep recess extending inwardly from one edge thereof to accommodate the body of the infant therein.

4. The table defined in claim 3 wherein said panel-like top and said legs are made from a foam plastic material.

5. The table defined in claim 2 wherein each of said legs is made from a pair of upper and lower leg elements having opposing surfaces which abut and are removably secured together by additional fastening means.

6. The table defined in claim 5 wherein each of said additional fastening means includes a pair of interlocking strips, one of said strips being secured to the lower surface of said upper leg element and the other of said strips being secured to the top surface of the corresponding lower leg element, said strips being armed with interlocking loop and hook fabric material.

7. The table defined in claim 2 wherein the legs at the front corners thereof have inner surfaces, with the inner surface of one front corner leg facing the inner surface of the other front corner leg, the inner surface of each leg being flat and tapered starting at the top of the leg and extending downwardly and away from the inner surface on the other front leg.

8. The table defined in claim 4 wherein said panel-like top and legs are covered with a cloth fabric material, with a rim made from cloth fabric material extending upwardly from the upper surface of the panel-like top and being located around at least part of the periphery thereof for assisting in retaining objects used by the infant on the panel-like top.

9. The table defined in claim 3 wherein a stretchable strap is secured on one end thereof to the rear edge of said panel-like top and is adapted to extend around the seat support and be removably secured on the other end thereof to an opposite portion of the rear edge of the panel-like top to fasten the table to the seat support.

10. A table primarily for use by an infant with his or her legs horizontal while occupying a child safety seat having a back and which is mounted upon and secured to a vehicle seat, said table comprising a panel-like top made from a resilient material and having upper and lower surfaces, said panel-like top having a relatively wide and relatively deep recess extending inwardly from its rear edge to accommodate the body of the infant therein and to provide a pair of rear edge portions on opposite sides of the recess whereby said rear edge portions are adapted to wrap around and engage the child seat to comfortably accommodate the body of the infant in said recess, a plurality of legs made from a resilient material and fastening means for each of said legs for removably securing the corresponding leg to the lower surface of said panel-like top whereby said legs are adapted to rest on the vehicle seat, said legs being relatively short and of a length sufficient to accommodate the legs of the infant beneath the panel-like top while enabling said panel-like top to form a rest for the forearms of the infant.

11. The table defined in claim 10 wherein each of said fastening means includes a pair of interlocking members, one of said members being secured to the lower surface of said panel-like top and the other of said members being secured to the top surface of the corresponding leg, said one member being armed with first interlocking loop and hook fabric material and said other member being armed with second interlocking loop and hook fabric material.

12. The table defined in claim 11 wherein said panel-like top is of generally rectangular configuration, with a leg and corresponding fastening means being provided at each of the four corners thereof.

13. The table defined in claim 12 wherein said panel-like top and said legs are made from a foam plastic material.

14. The table defined in claim 12 wherein each of said legs is made from a pair of upper and lower leg elements having opposing surfaces which abut and are removably secured together by additional fastening means.

15. The table defined in claim 14 wherein each of said additional fastening means includes a pair of interlocking strips, one of said strips being secured to the lower surface of said upper leg element and the other of said strips being secured to the top surface of the corresponding lower leg element, said strips being armed with interlocking loop and hook fabric material.

16. The table defined in claim 11 wherein the legs at the front corners thereof have inner surfaces, with the inner surface of one front corner leg facing the inner surface of the other front corner leg, the inner surface of each leg being flat and tapered starting at the top of the leg and extending downwardly and away from the inner surface on the other front leg.

17. The table defined in claim 13 wherein said panel-like top and legs are covered with a cloth fabric material, with a rim made from cloth fabric material extending upwardly from the upper surface of the panel-like top and being located around at least part of the periphery thereof for assisting in retaining objects used by the infant on the panel-like top.

18. The table defined in claim 10 wherein a stretchable strap is secured on one end thereof to the rear edge of said panel-like top and is adapted to extend around the child safety seat and is removably secured on the other end thereof to an opposite portion of the rear edge of the panel-like top to fasten the table to the child safety seat.

* * * * *